(12) United States Patent
Ikeda et al.

(10) Patent No.: US 9,908,300 B2
(45) Date of Patent: Mar. 6, 2018

(54) THERMOPLASTIC RESIN FINELY-FOAMED REFLECTIVE SHEET, LIGHT-REFLECTING PLATE, BACKLIGHT PANEL, AND METHOD OF PRODUCING THE FOAMED REFLECTIVE SHEET

(71) Applicant: FURUKAWA ELECTRIC CO., LTD., Tokyo (JP)

(72) Inventors: Hideyuki Ikeda, Tokyo (JP); Kojiro Inamori, Tokyo (JP); Masaki Onda, Tokyo (JP); Kazuhiro Kimura, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 508 days.

(21) Appl. No.: 14/330,325

(22) Filed: Jul. 14, 2014

(65) Prior Publication Data

US 2014/0322505 A1   Oct. 30, 2014

Related U.S. Application Data

(63) Continuation of application No. PCT/JP2013/071258, filed on Aug. 6, 2013.

(30) Foreign Application Priority Data

Aug. 9, 2012   (JP) ................ 2012-177612

(51) Int. Cl.
*B29D 11/00* (2006.01)
*B32B 27/36* (2006.01)
(Continued)

(52) U.S. Cl.
CPC ........... *B29D 11/0073* (2013.01); *B32B 3/00* (2013.01); *B32B 3/12* (2013.01); *B32B 3/26* (2013.01);
(Continued)

(58) Field of Classification Search
CPC .............. B32B 27/065; B32B 2307/21; B32B 2307/416; B32B 2250/40; B29D 11/0073
See application file for complete search history.

(56) References Cited

U.S. PATENT DOCUMENTS

| 5,672,409 A | 9/1997 | Miyakawa et al. |
| 7,171,746 B2 * | 2/2007 | Reil ................. H05K 1/0373 219/121.66 |

(Continued)

FOREIGN PATENT DOCUMENTS

| JP | 4-239540 A | 8/1992 |
| JP | 2007-090599 A | 4/2007 |

(Continued)

OTHER PUBLICATIONS

Extended European Search Report, dated Dec. 22, 2015, for European Application No. 13828107.6.

(Continued)

*Primary Examiner* — Hai Vo
(74) *Attorney, Agent, or Firm* — Birch, Stewart, Kolasch & Birch, LLP

(57) ABSTRACT

A thermoplastic resin finely-foamed reflective sheet, containing: a foamed layer; and non-foamed layers, each of which has a thickness of 150 μm or less and 30 μm or more, and which are provided one above the other while sandwiching the foamed layer between the non-foamed layers, wherein the thermoplastic resin finely-foamed reflective sheet has an integrated structure, wherein the foamed layer is a thermoplastic resin finely-foamed product having a homogeneous bubble structure, in which an average bubble diameter is 10 μm or less and 0.5 μm or more, and in which a bubble number density is $1\times10^6/mm^3$ or more and $1.0\times10^{12}/mm^3$ or less, and wherein at least one of the non-foamed layers comprises a functionality-providing layer.

10 Claims, 1 Drawing Sheet

(51) Int. Cl.
    B32B 5/18      (2006.01)
    G02B 5/02      (2006.01)
    B32B 27/06     (2006.01)
    B32B 27/18     (2006.01)
    B32B 27/28     (2006.01)
    B32B 3/00      (2006.01)
    B32B 3/12      (2006.01)
    B32B 3/26      (2006.01)
    B29C 47/00     (2006.01)
    B29C 47/06     (2006.01)
    B29K 105/04    (2006.01)

(52) U.S. Cl.
    CPC .............. *B32B 5/18* (2013.01); *B32B 27/065* (2013.01); *B32B 27/18* (2013.01); *B32B 27/28* (2013.01); *B32B 27/36* (2013.01); *B32B 27/365* (2013.01); *G02B 5/0247* (2013.01); *G02B 5/0284* (2013.01); *B29C 47/0019* (2013.01); *B29C 47/065* (2013.01); *B29K 2105/04* (2013.01); *B32B 2250/40* (2013.01); *B32B 2255/102* (2013.01); *B32B 2255/26* (2013.01); *B32B 2266/00* (2013.01); *B32B 2266/025* (2013.01); *B32B 2266/0264* (2013.01); *B32B 2266/08* (2013.01); *B32B 2274/00* (2013.01); *B32B 2307/21* (2013.01); *B32B 2307/302* (2013.01); *B32B 2307/40* (2013.01); *B32B 2307/416* (2013.01); *B32B 2307/536* (2013.01); *B32B 2307/71* (2013.01); *B32B 2307/712* (2013.01); *B32B 2307/72* (2013.01); *B32B 2457/00* (2013.01); *B32B 2457/20* (2013.01); *B32B 2457/202* (2013.01); *B32B 2551/00* (2013.01); *Y10T 428/24967* (2015.01)

(56) References Cited

U.S. PATENT DOCUMENTS

| | | | |
|---|---|---|---|
| 2008/0070998 | A1 | 3/2008 | Takada et al. |
| 2008/0300334 | A1* | 12/2008 | Masuda ................... B32B 5/20 521/149 |
| 2009/0068402 | A1* | 3/2009 | Yoshida ................. B29C 44/22 428/141 |
| 2013/0158143 | A1 | 6/2013 | Ikeda et al. |

FOREIGN PATENT DOCUMENTS

| | | |
|---|---|---|
| JP | 2007-187795 A | 7/2007 |
| JP | 2007-264283 A | 10/2007 |
| JP | 2008-230138 A | 10/2008 |
| JP | 2009-175522 A | 8/2009 |
| JP | 2010-222566 A | 10/2010 |
| JP | 2010-241946 A | 10/2010 |
| JP | 2012-058610 A | 3/2012 |
| JP | 2012-84473 A | 4/2012 |
| WO | WO 2012/023173 A1 | 2/2012 |

OTHER PUBLICATIONS

International Search Report issued in PCT/JP2013/071258, dated Sep. 3, 2013.
Korean Office Action and English translation thereof, dated Sep. 15, 2015, for corresponding Korean Application No. 10-2014-7007630.

* cited by examiner

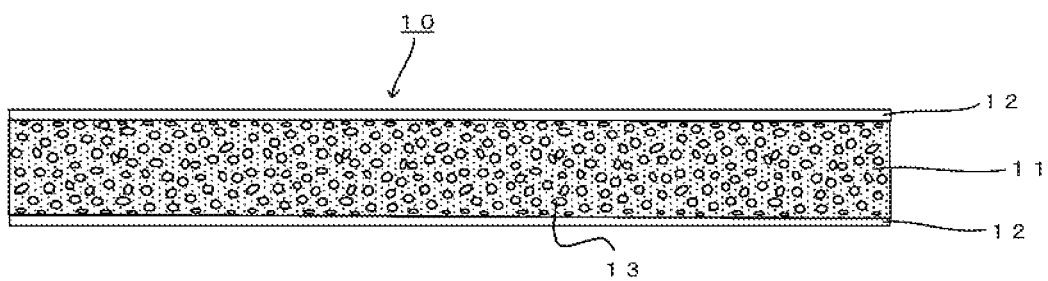

THERMOPLASTIC RESIN FINELY-FOAMED REFLECTIVE SHEET, LIGHT-REFLECTING PLATE, BACKLIGHT PANEL, AND METHOD OF PRODUCING THE FOAMED REFLECTIVE SHEET

CROSS-REFERENCE TO RELATED APPLICATIONS

This application is a Continuation of PCT International Application No. PCT/JP2013/071258 filed on Aug. 6, 2013, which claims priority under 35 U.S.C. § 119(a) to Japanese Patent Application No. 2012-177612 filed on Aug. 9, 2012. Each of the above applications is hereby expressly incorporated by reference, in its entirely, into the present application.

TECHNICAL FIELD

The present invention relates to an amorphous resin thermoplastic resin foamed sheet having fine bubbles and exerting one or more functionalities, a light-reflecting plate, a backlight panel and a method of producing the foamed reflective sheet.

BACKGROUND ART

Conventionally, a reflecting plate prepared by applying a coating material excellent in light reflection property to a metallic plate and a reflecting plate prepared by laminating resin films and the like excellent in light reflection property on a metallic plate have been used, as a reflecting plate for illumination and for a liquid crystal back light. In recent years, power saving and high efficiency have been more required in fields, such as an illuminating apparatus and a liquid crystal display. In particular, needs for space saving has been enhanced in fields, such as an electrical spectacular sign and a display. However, it is hard for the above-described reflecting plates to tackle the space saving.

Thus, a resin sheet having fine bubbles, which is excellent in light reflection property, and having high molding property, has been used, as a reflecting plate and the like for illumination and for a liquid crystal backlight (for example, see Patent Literature 1).

High functionalities are required for the light-reflecting plate that is provided to the application that is exposed to the outdoor air, such as an illuminating apparatus. The high functionalities mean various characteristics that are required for plastic products, such as antifouling property, surface hardness, and weather resistance. Generally, there sufficient functionalities are obtained in many cases, by applying to a surface part of the molded product.

Hitherto, there are a lot of examples in which foamed products having high functionalities have been realized, by addition of functional additives to a surface part of a plastic foamed sheet, for the purpose of applying these functionalities. However, it is known that such addition of functional additives generally exerts a major influence on foaming property of the resin, to cause coarsening of bubble structure.

As the method of applying high functionalities without exerting a major influence on the foaming property, a method, such as coating, laminate, or the like, is widely used (for example, see Patent Literature 2). However, these methods have a problem of high-cost due to the number of steps increased However, regarding the foamed sheet, not only fine bubbles, but also coarse bubbles of 0.5 mm or more (or a half or larger size of the sheet thickness) are likely to generate in foam formation. In particular, in a case where the thermoplastic resin is an amorphous resin, this tendency becomes remarkable. As a result, there is a problem that makes it difficult to use the foamed sheet as various kinds of molded articles including a light reflective material.

CITATION LIST

Patent Literatures

Patent Literature 1: WO 2012/023173
Patent Literature 2: JP-A-2007-90599 ("JP-A" means unexamined published Japanese patent application)

SUMMARY OF INVENTION

Technical Problem

The present invention is contemplated for providing: a thermoplastic resin finely-foamed reflective sheet that has a fine and homogeneous bubble structure of 10 μm or less in terms of average bubble diameter and that has high light-reflection efficiency and high functionalities; a light-reflecting plate; a backlight panel; and a method of producing the foamed reflective sheet.

Solution to Problem

The present inventors, having keenly conducted studies, solved the above-described tasks with the following means.
(1) A thermoplastic resin finely-foamed reflective sheet, comprising: a foamed layer; and non-foamed layers, each of which has a thickness of 150 μm or less and 30 μm or more, and which are provided one above the other while sandwiching the foamed layer between the non-foamed layers, wherein the thermoplastic resin finely-foamed reflective sheet has an integrated structure, wherein the foamed layer is a thermoplastic resin finely-foamed product having a homogeneous bubble structure, in which an average bubble diameter is 10 μm or less and 0.5 μm or more, and in which a bubble number density is $1 \times 10^6/mm^3$ or more and $1.0 \times 10^{12}/mm^3$ or less, and wherein at least one of the non-foamed layers comprises a functionality-providing layer.
(2) The thermoplastic resin finely-foamed reflective sheet described in (1), wherein the functionality-providing layer is an antistatic layer or an ultraviolet-absorbing layer, which contains an antistatic agent, an ultraviolet absorber or an antioxidant.
(3) The thermoplastic resin finely-foamed reflective sheet described in (2), wherein the antistatic agent, the ultraviolet absorber or the antioxidant is contained only in the functionality-providing layer, or wherein a content of the antistatic agent, the ultraviolet absorber or the antioxidant which is contained in at least one of the functionality-providing layer is larger than a content thereof which is contained in the remaining layer.
(4) The thermoplastic resin finely-foamed reflective sheet described in any one of (1) to (3), wherein each of the non-foamed layers comprises the functionality-providing layer.
(5) The thermoplastic resin finely-foamed reflective sheet described in any one of (1) to (4), wherein 50% by mass or more of a resin in the functionality-providing layer is composed of the same thermoplastic resin as that of the foamed layer.

(6) The thermoplastic resin finely-foamed reflective sheet described in any one of (1) to (5), wherein a thermoplastic resin is a polycarbonate.

(7) The thermoplastic resin finely-foamed reflective sheet described in any one of (1) to (6), wherein a reflectivity thereof at a wavelength of 550 nm (aluminum oxide standard white plate basis) is 98% or more.

(8) The thermoplastic resin finely-foamed reflective sheet described in any one of (1) to (7), wherein a reflectivity thereof at a wavelength of 350 nm (aluminum oxide standard white plate basis) is 30% or less.

(9) The thermoplastic resin finely-foamed reflective sheet described in any one of (1) to (8), wherein a surface specific resistance value thereof is $1 \times 10^{12} \Omega$ or less.

(10) A method of producing a foamed reflective sheet, wherein the foamed reflective sheet is the thermoplastic resin finely-foamed reflective sheet described in any one of (1) to (9), and wherein the method comprises steps (a) to (c):
(a) a step of preparing a resin sheet having at least three-layer structure by integral molding with co-extrusion, wherein the resin sheet comprises a thermoplastic resin layer for forming the foamed layer, and thermoplastic resin layers for forming the non-foamed layers, and wherein at least one of the non-foamed layers comprises the functionality-providing layer;
(b) a step of impregnating the resin sheet with an inert high-pressure gas; and
(c) a step of heating the resin sheet, to make the thermoplastic resin layer for forming the foamed layer foam.

(11) The method of producing a foamed reflective sheet described in (10), wherein a bubble nucleating agent is blended in an amount of from 0.1 to 10 parts by mass, to 100 parts by mass of a thermoplastic resin in the thermoplastic resin layer for forming the foamed layer.

(12) A light-reflecting plate, comprising the thermoplastic resin finely-foamed reflective sheet described in any one of (1) to (9).

(13) A backlight panel, having the light-reflecting plate described in (12).

In the present specification, the term "thermoplastic resin" is used as a concept including a blended resin composed of two or more kinds of thermoplastic resins, in addition to one kind of thermoplastic resin. Therefore, in a case where the thermoplastic resin is composed of one kind of thermoplastic resin, the term "composition of thermoplastic resin" means the kind of the thermoplastic resin, and if the thermoplastic resin is a blended resin composed of two or more kinds of thermoplastic resins, it means a composition of the blended resin.

In the present specification, the expression that a given raw material, member or composition is "composed of a thermoplastic resin" or "formed from a thermoplastic resin" is used as a concept including not only an embodiment in which the raw material, member or composition is composed only of the thermoplastic resin, but also an embodiment in which the raw material, member or composition is composed of a composition in which various kinds of additives are blended in the thermoplastic resin.

Specifically, an embodiment in which from 80 to 100% by mass is composed of a thermoplastic resin corresponds to an embodiment in which it is "composed of a thermoplastic resin" or "formed from a thermoplastic resin". Further, the expression "composed of a thermoplastic resin" or "formed from a thermoplastic resin" means an embodiment in which preferably from 90 to 100% by mass, more preferably from 95 to 100% by mass is composed of the thermoplastic resin. The same is applied to the case where the thermoplastic resin is identified by a specific resin name.

Advantageous Effects of Invention

According to the present invention, there can be provided a thermoplastic resin finely-foamed reflective sheet that has a fine and homogeneous bubble structure of 10 μm or less in terms of average bubble diameter and that has high light-reflection efficiency and high functionalities; a light-reflecting plate; a backlight panel; and a method of producing the foamed reflective sheet, which sheet exerts those performances, and which method is inexpensive and convenient.

Other and further features and advantages of the invention will appear more fully from the following description.

BRIEF DESCRIPTION OF DRAWINGS

FIG. 1 is a schematic diagram showing a vertical section of one embodiment of the thermoplastic resin finely-foamed reflective sheet of the present invention.

MODE FOR CARRYING OUT THE INVENTION

Hereinafter, embodiments of the thermoplastic resin finely-foamed reflective sheet according to the present invention are explained in detail with reference to the drawing. However, this invention is not limited by the embodiments.

One embodiment of the thermoplastic resin finely-foamed reflective sheet of the present invention is shown in FIG. 1. The thermoplastic resin finely-foamed reflective sheet (10) has a structure having a foamed layer (11) and non-foamed layers (12) provided on each side of the foamed layer. Either one or both of the non-foamed layers (12) provided on each side of the foamed layer (11) contains a functionality-providing layer. The non-foamed layer may be a functionality-providing layer.

In the thermoplastic resin finely-foamed reflective sheet of the present invention, each of the foamed layer and the non-foamed layers is formed from a thermoplastic resin. The composition of the thermoplastic resin which forms the foamed layer is different from the composition of the thermoplastic resin which forms the functionality-providing layer which is formed with the non-foamed layer.

[Foamed Layer]

The foamed layer of the thermoplastic resin finely-foamed reflective sheet of the present invention is composed of a thermoplastic resin. The thermoplastic resin is not particularly limited, and examples thereof include a polyolefin resin, a polyester resin, and a polycarbonate resin. In the present invention, a polyester resin and a polycarbonate resin are preferred. Especially, a polycarbonate resin is preferred, because it is excellent in characteristics, such as lightweight, shape stability, and economy, and also it is excellent in light reflection property.

As for the thermoplastic resin, an amorphous one is preferred, from the viewpoint of non-foamed layer formation.

The thickness of the foamed layer is appropriately determined, depending on the intended usage, the embodiment and the like of the reflective sheet, and cannot be determined unambiguously. It is preferably from 300 to 5,000 μm, and more preferably from 500 to 1,500 μm.

The polycarbonate resin, although there is no particular limitation on the production method thereof, can be obtained, by subjecting to a reaction of an aliphatic or aromatic diol or polyol compound and phosgene or a diester carbonate. Alternatively, the polycarbonate resin can be obtained by subjecting to a reaction of an aromatic diol or polyol compound, or the aromatic diol or polyol compound together with a small amount of polyhydroxy compound, and phosgene or a diester carbonate.

Examples of the aromatic diol or polyol compound include 2,2-bis(4-hydroxyphenyl)propane (so-called: bisphenol A), bis(4-hydroxyphenyl)methane, 1,1-bis(4-hydroxyphenyl)ethane, 1,1-bis(4-hydroxyphenyl)cyclohexane, 2,2-bis(4-hydroxy-3,5-dimethylphenyl)propane, 2,2-bis(4-hydroxy-3-methylphenyl)propane, bis(4-hydroxyphenyl) ether, bis(4-hydroxyphenyl)sulfide, bis(4-hydroxyphenyl) sulfone, 4,4'-[1,4-phenylene-bis(1-methylethylidene)] bisphenol, hydroquinone, resorcinol, and 4,4'-dihydroxydiphenyl.

Further, the foamed layer is preferably composed of a thermoplastic resin to which a bubble nucleating agent is added as an additive. By addition of the bubble nucleating agent, more bubble nuclei can be formed in the thermoplastic resin. This makes it possible to form the foamed layer having finer bubbles, because the thus-formed bubbles in the foaming step described below inhibit mutual growth of the bubbles from each other. The bubble nucleating agent is not particularly limited, and a polyester-based elastomer and a polycarbonate-based elastomer can be preferably used.

The bubble nucleating agent is preferably blended in an amount of from 0.1 to 10 parts by mass, to 100 parts by mass of the thermoplastic resin.

The foamed layer may contain, in addition to the thermoplastic resin and the bubble nucleating agent, various kinds of additives, such as a crystallization nucleating agent, a crystallization accelerator, an antioxidant, an antistatic agent, an ultraviolet inhibitor, a light stabilizer, a fluorescent whitening agent, a pigment, a dye, a compatibilizer, a slipping agent, a reinforcing agent, a flame retardant, a cross-linking agent, a cross-linking aid, a plasticizer, a thickener, and a viscosity depressant.

In a case where the foamed layer contains any of those compounds, other than the compound necessary for forming bubbles like the bubble nucleating agent, it is preferred that the content thereof is less than the content thereof in the functionality-providing layer described below.

The foamed layer provided with the thermoplastic resin finely-foamed reflective sheet of the present invention has bubbles. The bubbles are preferably free-standing bubbles. More specifically, preferably 70% or greater, more preferably from 80 to 100%, still more preferably from 90 to 100%, and further preferably from 95 to 100%, of the total number of bubbles of the thermoplastic resin finely-foamed reflective sheet are the proportion of the free-standing bubbles.

The average bubble diameter is 10 μm or less. From the viewpoint of achieving decrease in a thinner sheet and enhancement of high reflectivity at the same time, the average bubble diameter is preferably 7.0 μm or less, more preferably 5.0 μm or less, further preferably 3.0 μm or less, and particularly preferably 2.0 μm or less.

Further, the average bubble diameter is generally 0.5 μm or more, and it may be 1.0 μm or more.

Measurement of the average bubble diameter can be carried out, according to the following method.

(Measurement of Average Bubble Diameter)

An average bubble diameter is determined, with reference to ASTM D3576-77. A scanning electron microscopy (SEM) photograph of a cross-section of the foamed sheet is taken. Straight lines are drawn on the thus-taken SEM photograph in a horizontal direction and a vertical direction. A length of an individual chord of a bubble through which the straight lines pass is measured, to calculate an average t of the lengths. With a magnification of the photograph being M, t and M are assigned to an expression below, to determine an average bubble diameter d.

$$d = t/(0.616 \times M)$$

The bubble number density of the foamed layer is $1.0 \times 10^6/mm^3$ or more. From the viewpoint of achieving decrease in a thinner sheet and enhancement of high reflectivity at the same time, the bubble number density of the foamed layer is preferably from $1.0 \times 10^7/mm^3$ to $1.0 \times 10^{11}/mm^3$, and more preferably from $1.0 \times 10^8/mm^3$ to $1.0 \times 10^{11}/mm^3$. The upper limit of the bubble number density of the foamed layer is $1.0 \times 10^{12}/mm^3$ or less, and preferably $1.0 \times 10^{11}/mm^3$.

Measurement of the bubble number density of the foamed layer can be carried out, according to the following method.

(Measurement of Bubble Number Density)

A SEM photograph of a longitudinal section of the foamed sheet is taken, and an arbitrary region of 100×100 μm in the foamed layer on the SEM photograph is chosen at random, and the number of bubbles n existing therein is counted, to calculate the number of bubbles existing per $mm^2$. The thus-obtained number to the power of 3/2 is calculated, to convert it to the number of bubbles per $mm^3$, which is defined as a bubble number density.

[Non-Foamed Layer]

The resin which constitutes the non-foamed layer is preferably a resin including the same thermoplastic resin as that of the foamed layer. The proportion of the same thermoplastic resin as that of the foamed layer is preferably 50% by mass or more of the resin which constitutes the non-foamed layer. The case where the proportion is 100% by mass, that is, the same thermoplastic resin as that of the foamed layer, is preferred. Especially, a polycarbonate resin is preferred.

The thickness of the non-foamed layer formed in the foamed product is 30 μm or more, and more preferably 60 μm or more. The thickness of the functionality-providing layer which is integrally molded is preferably less than 30 μm, and more preferably 25 μm or less. Further, from the viewpoint of maintaining optical properties, it is preferred that the thickness of the non-foamed layer is not more than 150 μm.

If the thickness of the non-foamed layer is set to less than 30 μm, the concentration of a functional material added to the non-foamed layer resin increases, whereby light absorption characteristics increase. As a result, optical characteristics, such as light reflectivity or the like, are lowered. Therefore, to form a non-foamed layer having the thickness of less than 30 μm is undesirable.

The thickness of the non-foamed layer can be measured using a scanning electron microscope (SEM) photograph.

Specifically, by taking the scanning electron microscope (SEM) photograph, followed by drawing thereon parallel lines at the surface portion of the thermoplastic resin finely-foamed reflective sheet and at the most surface side line of the foamed layer, the interval between the parallel lines can be measured as a thickness of the non-foamed layer which acts as an unfoamed layer.

The non-foamed layer may contain, in addition to the thermoplastic resin, various kinds of additives, such as a crystallization nucleating agent, a crystallization accelerator, an antioxidant, an antistatic agent, an ultraviolet inhibitor, a light stabilizer, a fluorescent whitening agent, a pigment, a dye, a compatibilizer, a slipping agent, a reinforcing agent, a flame retardant, a cross-linking agent, a cross-linking aid, a plasticizer, a thickener, and a viscosity depressant.

[Functionality-Providing Layer]

In the present invention, for at least one of the non-foamed layers, a functionality-providing layer is provided, as at least one constitutional layer thereof. The functionality-providing layer is more preferably provided inside the non-foamed layers on each side of the foamed layer. In this case, as long as the functionality-providing layer is contained in the non-foamed layer, the location of the non-foamed layer is not particularly limited. It may be an outermost layer, an innermost layer, or an intermediate layer. An outermost layer or an innermost layer is favorable in practice.

The function of the functionality-providing layer is a function other than directly antireflection itself, such as anti-electrostatic charge, ultraviolet absorption, anti-deterioration, and the like. In the present invention, among these functions, anti-electrostatic charge and ultraviolet absorption can be preferably applied to. By setting the thickness of the integrally-molded functionality-providing layer to less than 30 μm (more preferably 25 μm or less), generation of course bubbles (so-called "swollenness") can be prevented.

As for the foregoing functions, it is preferred that the function is developed by containing an additive. As such an additive, an antistatic agent, an ultraviolet absorbent, and an antioxidant are preferred, and these may be contained singly, or may be used in combination. In the present invention, these are preferably used in combination. Especially, an antistatic agent and an ultraviolet absorbent are preferably used in combination.

The antistatic agent may be either an organic antistatic agent or an inorganic antistatic agent.

In the present invention, the organic antistatic agent is preferred, and an anionic, cationic, or nonionic surfactant is preferred. Especially, an anionic surfactant is preferred.

As such a surfactant, for example, DENON V-57S and DENON 2723, manufactured by Maruzen Petrochemical, are preferably used.

The content of the antistatic agent is preferably from 0.05 to 5 parts by mass, more preferably from 0.1 to 5 parts by mass, and further preferably from 0.1 to 2 parts by mass, to 100 parts by mass of the resin in the functionality-providing layer.

Examples of the ultraviolet absorbent (including the light stabilizer) include: organic compounds, such as hindered amine-based, salicylic acid-based, benzophenone-based, benzotriazole-based, benzooxadinone-based, cyanoacrylate-based, triazine-based, benzoate-based, oxalic anilide-based, or organic nickel-based compounds; and inorganic compounds obtained using a sol-gel method or the like. Among these, a colorless compound is preferred.

Examples of the hindered amine-based compound include bis(2,2,6,6-tetramethyl-4-piperidyl) sebacate, dimethyl succinate-1-(2-hydroxyethyl)-4-hydroxy-2,2,6,6-tetramethylpiperidine polycondensation product, tetrakis(2,2,6,6-tetramethyl-4-piperidyl)-1,2,3,4-butane tetracarboxylate, 2,2,6,6-tetramethyl-4-piperidyl benzoate, bis(1,2,2,6,6-pentamethyl-4-piperidyl)-2-(3,5-di-t-butyl-4-hydroxybenzyl)-2-n-butyl malonate, bis(N-methyl-2,2,6,6-tetramethyl-4-piperidyl) sebacate, and 1,1'-(1,2-ethanediyl)bis(3,3,5,5-tetramethylpiperadinone).

Examples of the salicylic acid-based compound include p-t-butylphenyl salicylate and p-octylphenyl salicylate.

Examples of the benzophenone-based compound include 2-hydroxy-4-n-octoxybenzophenone, 2-hydroxy-4-methoxy-benzophenone, 2-hydroxy-4-ethoxy-benzophenone, 2,4-dihydroxybenzophenone, 2-hydroxy-4-methoxy-5-sulfobenzophenone, 2,2',4,4'-tetrahydroxybenzophenone, 2,2'-dihydroxy-4-methoxybenzophenone, 2,2'-dihydroxy-4,4'-dimethoxybenzophenone, and bis(2-methoxy-4-hydroxy-5-benzoylphenyl)methane.

Examples of the benzotriazole-based compound include 2-(2'-hydroxy-5'-methylphenyl)benzotriazole, 2-(2'-hydroxy-5'-t-butylphenyl)benzotriazole, 2-(2'-hydroxy-3',5'-di-t-butylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-5'-t-octylphenyl)benzotriazole, 2-(2'-hydroxy-3',5'-di-t-amylphenyl) benzotriazole, 2,2'-methylene-bis[4-(1,1,3,3-tetramethylbutyl)-6-(2H-benzotriazole-2-yl)phenol], 2-(2'-hydroxy-5-methacryloxyphenyl)-2H-benzotriazole, 2-[2'-hydroxy-3'-(3'',4'',5'',6''-tetrahydrophthalimidomethyl)-5'-methylphenyl]benzotriazole, 2-(2'-hydroxy-5-acryloyloxyethyphenyl)-2H-benzotriazole, 2-(2'-hydroxy-5-methacryloxyethylphenyl)-2H-benzotriazole, and 2-(2'-hydroxy-3'-t-butyl-5'-acryloylethyphenyl)-5-chloro-2H-benzotriazole.

Examples of the cyanoacrylate-based compound include 2-ethyl-2-cyano-3,3-diphenylacrylate, 2-ethylhexyl-2-cyano-3,3-diphenylacrylate, and 1,3-bis-[2'-cyano-3,3'-diphenylacryloyloxy]-2,2-bis-[(2-cyano-3',3'-diphenylacryloyl)oxy]methylpropane.

Examples of the triazin-based compound include 2-(4,6-diphenyl-1,3,5-triazin-2-yl)-5-(hexyl)oxy-phenol, and 2-(4, 6-bis-2,4-dimethylphenyl-1,3,5-triazin-2-yl)-5-(hexyl)oxy-phenol.

Examples of the benzoate-based compound include 2,4-di-t-butylphenyl-3',5'-di-t-butyl-4'-hydroxybenzoate, resorcinol monobenzoate, and methyl ortho-benzoylbenzoate. Examples of the oxalic anilide-based compound include 2-ethoxy-2'-ethyloxalic acid bis-anilide. Examples of the organic nickel-based compound include nickel bis(octylphenyl)sulfide, [2,2'-thiobis (4-t-octylphenolato)]-n-butylamine nickel, nickel complex-3,5-di-t-butyl-4-hydroxybenzylphosphoric acid monoethylate, and nickel dibutyldithiocarbamate.

Examples of the benzoxazinone-based compound include 2,2'-(1,4-phenylene)bis[4H-3,1-benzoxazine-4-one].

Examples of the malonate-based compound include propanedioic acid [(4-methoxyphenyl)-methylene]-dimethyl ester.

Among these, a hindered amine-based compound, a benzophenone-based compound, and a benzotriazole-based compound are preferred.

The content of the ultraviolet absorbent (including the light stabilizer) is preferably from 0.05 to 10 parts by mass, more preferably from 0.1 to 5 parts by mass, and further preferably from 1 to 2 parts by mass, to 100 parts by mass of the resin in the functionality-providing layer.

Examples of the antioxidant include a phenol-based antioxidant, a hindered phenol-based antioxidant, an aniline-based antioxidant, a trivalent phosphorus-based compound, ascorbic acid, hydroxylamines, and various kinds of reducing agents other than these compounds.

The antioxidant also acts stabilization of the ultraviolet absorbent, and the content of the antioxidant is preferably from 0.05 to 10 parts by mass, more preferably from 0.1 to 5 parts by mass, and further preferably from 1 to 2 parts by mass, to 100 parts by mass of the resin in the functionality-providing layer.

[Production of Foamed Reflective Sheet]

The method of producing the thermoplastic resin finely-foamed reflective sheet of the present invention is explained below.

The thermoplastic resin finely-foamed reflective sheet of the present invention is produced, by preparing a resin sheet having at least three-layer stricture composed of a thermoplastic resin layer for forming the foamed layer and thermoplastic resin layers for forming the non-foamed layers, via integral molding, and then using the resin sheet.

Among these, the functionality-providing layer is contained in at least one of the non-foamed layers, and the functionality-providing layer contains an additive that applies a function thereto. The non-foamed layer may be the functionality-providing layer.

More specifically, the production is preferably carried out through the following steps (a) to (c):

(a) A step of preparing a resin sheet having at least three-layer stricture composed of a thermoplastic resin layer for forming the foamed layer and thermoplastic resin layers for forming the non-foamed layers, by integral molding with co-extrusion;

(b) A step of impregnating a high-pressure inert gas into the resin sheet; and (c) A step of heating the resin sheet, to make the thermoplastic resin layer for forming the foamed layer foam.

The resin sheet having at least three-layer structure which is produced in the step (a) is preferably a three-layer structure composed of the thermoplastic resin layer for forming the foamed layer and the thermoplastic resin layers for forming the non-foamed layers, which are provided on each side thereof. According to the intended embodiments of the foamed sheet, a four or more-layer configuration may as well be adopted appropriately. The thermoplastic resin layer for forming the foamed layer is composed of the thermoplastic resin which constitutes the foamed layer, and the thermoplastic resin layers for forming the non-foamed layers each are composed of the thermoplastic resin which constitutes the non-foamed layer.

In the present invention, it is preferred that the functionality-providing layer is contained in the non-foamed layers on each side of the foamed layer, and the functionality-providing layer contains an additive that applies a function thereto.

In the step (b), an inert gas is impregnated into the resin sheet obtained by the step (a). It is preferred to form a roll by rolling up the resin sheet obtained by the step (a) with a separator stacked on top of one another, followed by holding the resultant roll in a pressured inert gas atmosphere, to impregnate the inert gas into the resin sheet. The separator may be any one, as long as it has voids through which the inert gas and an organic solvent, used as needed, come and go freely, and impregnation of the inert gas into the separator itself is negligible. If recited, preferred examples of the separator include a resinous non-woven fabric, and a metallic mesh.

Further, it is preferred to impregnate the inert gas into the resin sheet obtained in the step (a) in a non-stretched state. If it has been stretched, there is a possibility that gas does not penetrate into the sheet.

Before impregnating the inert gas into the rolled resin sheet, an organic solvent may be contained in the resin sheet. If the organic solvent is contained in the resin sheet, crystallinity of the thermoplastic resin sheet can be improved, and stiffness (rigidity) of the sheet is enhanced, whereby a mark of the separator becomes difficult to remain on the sheet surface. Further, an effect of reducing the penetration time period for the inert gas can also be expected.

Examples of the organic solvent include benzene, toluene, methyl ethyl ketone, ethyl formate, acetone, acetic acid, dioxane, m-cresol, aniline, acrylonitrile, dimethyl phthalate, nitroethane, nitromethane, and benzyl alcohol. Especially, acetone is preferably used.

Examples of the inert gas include helium, nitrogen, carbon dioxide, and argon. Especially, carbon dioxide is preferred, from the viewpoint that a large amount of carbon dioxide can be contained in the thermoplastic resin. The penetration pressure of the inert gas at room temperature (for example, 17° C.) is preferably from 0.2 to 15 MPa, and more preferably from 0.25 to 10 MPa. Further, the penetration time period of the inert gas is generally 1 hour or more (preferably from 1 to 30 hours), and it is preferred to continue to penetrate the inert gas until saturation.

In the step (c), the inert gas-impregnated resin sheet obtained in the step (b) is foamed. This foaming step is carried out under the conditions that the thermoplastic resin layer for forming the foamed layer is foamed, while the thermoplastic resin layers for forming the non-foamed layers are not foamed. Specifically, the foamed layer can be formed, by removing the separator from the roll, and then heating the resin sheet to a temperature which is equal to or more than a softening point of the thermoplastic resin for forming the foamed layer. The heating is preferably carried out at a temperature which is lower than a melting point of the foamed layer. The heating temperature for foam formation is preferably from 120 to 240° C., and more preferably from 130 to 200° C.

Further, the heating time period is preferably from 30 seconds to 10 minutes, and more preferably from 10 seconds to 5 minutes.

Various methods can be applied to, to foam the thermoplastic resin layer for forming the foamed layer, but to prevent the thermoplastic resin layers for forming the non-foamed layers from foaming. For example, it is possible to control foaming property of each of the resin layers to some extent, by adding a bubble nucleating agent to the thermoplastic resin layer for forming the foamed layer, or even by adding a crystallization nucleating agent or a crystallization accelerator to the thermoplastic resin layers for forming the non-foamed layers. Further, it is possible to control the foaming property more accurately, by using a specific resin as a thermoplastic resin which is used for formation of each layer. Preferable resins as such a thermoplastic resin are as described above.

The thickness of the thermoplastic resin finely-foamed reflective sheet of the present invention is preferably from 0.2 to 2.0 mm, more preferably from 0.5 to 1.5 mm, further preferably from 0.8 to 1.2 mm, particularly preferably from 0.9 to 1.1 mm, and most preferably 1.0±0.05 mm. Further, the specific gravity of the foamed sheet of the present invention is preferably from 0.2 to 0.7, more preferably from 0.3 to 0.7, and further preferably from 0.4 to 0.65. The specific gravity may be set to 0.5 or less.

The reflectivity of the thermoplastic resin finely-foamed reflective sheet of the present invention at the wavelength of 550 nm (aluminum oxide standard white plate basis) is preferably 98% or more. Further, the reflectivity thereof at the wavelength of 350 nm (aluminum oxide standard white plate basis) is preferably 30% or less.

The reflectivity of the thermoplastic resin finely-foamed reflective sheet at the wavelength of 550 nm and the reflectivity thereof at the wavelength of 350 nm can be measured as follows.

(Measurement of Reflectivity)

Measurement of reflectivity at the wavelength of 550 nm or 350 nm is carried out, under the conditions of, for example, spectroscopic slit of 4 nm, using a spectrophotometer (for example, U-4100, manufactured by Hitachi Hi-Technologies Corporation) and using an aluminum oxide white plate (210-0740, manufactured by Hitachi Hi-Tech Fielding Corporation) as a reference.

In the thermoplastic resin finely-foamed reflective sheet of the present invention, the specific resistance of the thermoplastic resin finely-foamed reflective sheet surface is preferably $1 \times 10^{12} \Omega$ or less. The upper limit of the surface specific resistance of the thermoplastic resin finely-foamed reflective sheet is preferably $1 \times 10^{14} \Omega$ or less. In a case where a surface specific resistance exceeds this upper limit, a practical antistatic property is not obtained.

By adjusting the surface specific resistance of the thermoplastic resin finely-foamed reflective sheet, an antistatic property can be applied to the thermoplastic resin finely-foamed reflective sheet, and this enables a long-term maintenance of high reflectiveness.

(Measurement of Surface Specific Resistance)

Measurement of a surface specific resistance is carried out, under the conditions of applied voltage 500 V, using a high-resistance meter (for example, R8340A, manufactured by ADVANTEST) with a 50 mm$\phi$ probe.

(Measurement of Density)

The overall density of the thermoplastic resin finely-foamed reflective sheet is measured, according to a method of collecting gas over water.

The use of the thermoplastic resin finely-foamed reflective sheet of the present invention is not particularly limited, and, for example, it may be used as a light-reflecting plate or a loudspeaker diaphragm. Especially, it may be preferably used as a light-reflecting plate. More specifically, it is preferred as a light-reflecting plate which is used for a backlight panel of a liquid crystal display device or the like.

A coating material containing various kinds of the additives or the like may be coated on the thermoplastic resin finely-foamed reflective sheet of the present invention, and such a thermoplastic resin finely-foamed reflective sheet is also included in the thermoplastic resin finely-foamed reflective sheet of the present invention.

EXAMPLES

The present invention will be described in more detail based on examples given below, but the invention is not meant to be limited by these.

Example 1

After forming a foamable layer from a polycarbonate resin SI8000L, manufactured by Sumika Styron Polycarbonate, to which 0.5% by mass of N Jester-NU-100, manufactured by New Japan Chemical, has been added, each of 18 μm-thick functionality-providing layers was laminated on each side of the foamable layer, to obtain a 600 μm-thick polycarbonate sheet. The functionality-providing layer was composed of SI8000L, manufactured by Sumika Styron Polycarbonate, to which 0.5% by mass of a surfactant-based antistatic agent DENON V-57S (manufactured by Maruzen Petrochemical) and 0.25% by mass of a benzophenone-based ultraviolet absorbent were added, to be a compound. The thus-obtained sheet was treated for 24 hours in carbon dioxide of 17° C. and 5.5 MPa, followed by heating for 1 minute in an atmosphere at 145° C., to prepare a foamed sheet. The thickness of the foamed sheet was 1,000 μm.

The following measurement and evaluation of the foamed sheet were carried out.

(1) Thickness of Non-Foamed Layer

By taking a scanning electron microscope (SEM) photograph, followed by drawing thereon parallel lines at the surface portion of the foamed sheet and at the most surface side line of the foamed layer, the interval between the parallel lines was measured as a thickness of the non-foamed layer.

(2) Measurement of Bubble Diameter

An average bubble diameter was determined, with reference to ASTM D3576-77. A scanning electron microscopy (SEM) photograph of a cross-section of the foamed sheet was taken. Straight lines were drawn on the thus-taken SEM photograph in a horizontal direction and a vertical direction. A length of an individual chord of a bubble through which the straight lines pass was measured, to calculate an average t of the lengths. With a magnification of the photograph being M, t and M were assigned to an expression below, to determine an average bubble diameter d.

$$d=t/(0.616 \times M)$$

(3) Measurement of Bubble Number Density

A SEM photograph of a longitudinal section of the foamed sheet was taken, and an arbitrary region of 100×100 μm in the foamed layer on the SEM photograph was chosen at random, and the number of bubbles n existing therein was counted, to calculate the number of bubbles existing per mm$^2$. The thus-obtained number to the power of $\frac{3}{2}$ was calculated, to convert it to the number of bubbles per mm$^3$, which was defined as a bubble number density.

(4) Measurement of Overall Foamed Sheet Density

The specific gravity of the foamed film was measured, according to a method of collecting gas over water, and this was defined as a density of the foamed product.

(5) Measurement of Reflectivity

Overall Optical Reflectivity

The reflectivity was measured at a wavelength of 350 nm or 550 nm, under the conditions of a spectral slit of 4 nm, using a spectrophotometer U-4100, manufactured by Hitachi High-Technologies. In Table 1, relative values of reflectivity of each foamed sheet are shown, with a reflectivity of a white board that was solidified finely-powdered aluminum oxide being 100%.

(6) Measurement of Surface Specific Resistance

Evaluation was carried out, with reference to JIS K 6911. Measurement of surface specific resistance was carried out, using R8340A, manufactured by ADVANTEST, with a high-resistance-measuring chamber R12702A.

(7) Light Fastness Test

Measurement of color tone in the Luv expression system was carried out, using CM-300, manufactured by Konica Minolta. Then, irradiation was carried out for 16 hours, under the conditions of 300 μW/m$^2$ and irradiation distance 100 mm, using EYE Super UV Tester, manufactured by Suga Test Instruments. The sample after irradiation was subjected to the measurement again, using the CM-300. Then, a color difference ΔE was calculated from the following formula, to evaluate resistance to ultraviolet discoloration.

$$\Delta E=\sqrt{(L^2+u^2+v^2)}$$

Each of L, u and v each represent a difference of the coordinate value in the color space.

The thus-obtained sheet was a homogeneous foamed product with a bubble diameter of about 1 μm, had a density of 330 kg/m³, and had non-foamed layers each about 50 μm at the surface parts thereof. The reflectivity of the foamed sheet at wavelength 550 nm was 100% ($Al_2O_3$ standard), and the reflectivity thereof at wavelength 350 nm was 28% ($Al_2O_3$ standard). Further, the surface specific resistance was $1.83 \times 10^{11} \Omega$, and the color difference ΔE after the ultraviolet irradiation test was 13.

The obtained results were shown together in Table 1.

Example 2

A foamed sheet was prepared in the same manner as in Example 1, except that the thickness of the functionality-providing layers at each side was changed to 30 μm.

Evaluation was carried out in the same manner as in Example 1.

The thus-obtained sheet was a homogeneous foamed product with a bubble diameter of about 1 μm, had a density of 330 kg/m³, and had non-foamed layers each about 50 μm at the surface parts thereof. The reflectivity of the foamed sheet at wavelength 550 nm was 98% ($Al_2O_3$ standard), and the reflectivity thereof at wavelength 350 nm was 13% ($Al_2O_3$ standard). Further, the surface specific resistance was $8.62 \times 10^{10} \Omega$, and the color difference ΔE after the ultraviolet irradiation test was 8.

Comparative Example 1

Using the same compound as in Example 1, a 600 μm-thick polycarbonate sheet was foamed, on each side surface of which a 60 μm-thick functionality-providing layer was laminated, in the same foaming manner as in Example 1, to obtain a foamed sheet. At the surface of the thus-obtained sheet, a large quantity of balloon-shaped swollenness was occurred, and it was difficult to obtain a sample which is available to conduct evaluations, such as the optical characteristics, the surface specific resistance, and the ultraviolet irradiation test.

Comparative Example 2

A 600 μm-thick and single-layer-structured polycarbonate sheet was obtained, using a compound, in which 0.5% by mass of a surfactant-based antistatic agent DENON V-57S (manufactured by Maruzen Petrochemical) and 0.25% by mass of a benzophenone-based ultraviolet absorbent were added, to the same compound as that in the foamed layer in Example 1. The resultant sheet was foamed in the same manner as in Example 1, to obtain a foamed sheet. The thus-obtained sheet had a coarse foamed structure with an average bubble diameter of about 20 μm, and had a density of 330 kg/m³. The reflectivity of the foamed sheet at wavelength 550 nm was 96% ($Al_2O_3$ standard), and the reflectivity thereof at wavelength 350 nm was 11% ($Al_2O_3$ standard). Further, the surface specific resistance was $5.57 \times 10^{10} \Omega$, and the color difference ΔE after the ultraviolet irradiation test was 9.

The obtained results were shown together in Table 1.

TABLE 1

|  | Example 1 | Example 2 | C. Example 1 | C. Example 2 |
|---|---|---|---|---|
| Thickness of extruded sheet | 600 μm | 600 μm | 600 μm | 600 μm |
| Thickness of functionality-providing layer | 18 μm | 30 μm | 60 μm | — |
| Thickness of foamed sheet | 1,000 μm | 1,000 μm | — | 1,000 μm |
| Thickness of non-foamed layer | 50 μm | 50 μm | — | 50 μm |
| Bubble diameter | 1 μm | 1 μm | — | 20 μm |
| Reflectivity (at 550 nm) | 100% ($Al_2O_3$) | 98% ($Al_2O_3$) | — | 96% ($Al_2O_3$) |
| Reflectivity (at 350 nm) | 28% ($Al_2O_3$) | 13% ($Al_2O_3$) | — | 11% ($Al_2O_3$) |
| Surface specific resistance | $1.83 \times 10^{11} \Omega$ | $8.62 \times 10^{10} \Omega$ | — | $5.57 \times 10^{10} \Omega$ |
| Color difference (ΔE) | 13 | 8 | — | 9 |

Note:
"C. Example" means Comparative Example.

Each of the foamed sheets of Examples 1 and 2 according to the present invention has a fine and homogeneous bubble structure with an average bubble diameter of 1 μm, and also has a high reflectivity. From this, the use of the thermoplastic resin finely-foamed reflective sheet of the present invention is found to be beneficial and useful as a light-reflecting plate or a backlight panel.

Having described our invention as related to this embodiment, it is our intention that the invention not be limited by any of the details of the description, unless otherwise specified, but rather be construed broadly within its spirit and scope as set out in the accompanying claims.

DESCRIPTION OF SYMBOLS

10 Thermoplastic resin finely-foamed reflective sheet
11 Foamed layer
12 Non-foamed layer, or non-foamed layer containing a functionality-providing layer
13 Bubble

The invention claimed is:
1. A thermoplastic resin finely-foamed reflective sheet, comprising:
   a foamed layer; and
   non-foamed layers, each of which has a thickness of 150 μm or less and 30 μm or more, and which are provided one above the other while sandwiching the foamed layer between the non-foamed layers, wherein the thermoplastic resin finely-foamed reflective sheet has an integrated structure, wherein the foamed layer is a thermoplastic resin finely-foamed product having a homogeneous bubble structure, in which an average bubble diameter is 10 μm or less and 0.5 μm or more, and in which a bubble number density is $1\times10^6$/mm$^3$ or more and $1.0\times10^{12}$/mm$^3$ or less, wherein at least one of the non-foamed layers comprises a functionality-providing layer having a thickness of less than 30 μm, wherein the integrated structure comprises the non-foamed layer and the foamed layer in this order from the top of the thermoplastic resin finely-foamed reflective sheet, and the non-foamed layer is composed of the functionality-providing non-foamed layer and a non-functionality-providing non-foamed layer in this order from the top of the thermoplastic resin finely-foamed reflective sheet, and wherein the thermoplastic resin is a polycarbonate.

2. The thermoplastic resin finely-foamed reflective sheet according to claim 1, wherein the functionality-providing layer contains an antistatic agent, an ultraviolet absorber or an antioxidant.

3. The thermoplastic resin finely-foamed reflective sheet according to claim 2, wherein the antistatic agent, the ultraviolet absorber or the antioxidant is contained only in the functionality-providing layer, or wherein a content of the antistatic agent, the ultraviolet absorber or the antioxidant which is contained in at least one of the functionality-providing layer is larger than a content thereof which is contained in the remaining layer.

4. The thermoplastic resin finely-foamed reflective sheet, according to claim 2, wherein a reflectivity thereof at a wavelength of 550 nm (aluminum oxide standard white plate basis) is 98% or more.

5. The thermoplastic resin finely-foamed reflective sheet according to claim 1, wherein 50% by mass or more of a resin in the functionality-providing layer is composed of the same thermoplastic resin as that of the foamed layer.

6. The thermoplastic resin finely-foamed reflective sheet according to claim 1, wherein a reflectivity thereof at a wavelength of 550 nm (aluminum oxide standard white plate basis) is 98% or less.

7. The thermoplastic resin finely-foamed reflective sheet according to claim 1, wherein a reflectivity thereof at a wavelength of 350 nm (aluminum oxide standard white plate basis) is 30% or less.

8. The thermoplastic resin finely-foamed reflective sheet according to claim 1, wherein a surface specific resistance value thereof is $1\times10^{12}\Omega$ or less.

9. A light-reflecting plate, comprising the thermoplastic resin finely-foamed reflective sheet according to claim 1.

10. A backlight panel, having the light-reflecting plate according to claim 9.

* * * * *